United States Patent [19]

Reig et al.

[11] Patent Number: 5,378,661
[45] Date of Patent: Jan. 3, 1995

[54] SYNTHETIC PHYLLOSILICATES AND PROCESS FOR THEIR PREPARATION

[75] Inventors: Patrice Reig, Talence; Gérard Demazeau, Gradignan Cedex; Roger Naslain, Pessac, all of France

[73] Assignee: Societe Europeenne de Propulsion, Suresnes, France

[21] Appl. No.: 166,227

[22] Filed: Dec. 13, 1993

[30] Foreign Application Priority Data

Dec. 21, 1992 [FR] France .................. 9215321

[51] Int. Cl.$^5$ .................................................. C03C 10/04
[52] U.S. Cl. ................................................ 501/2; 501/4; 501/12; 423/331
[58] Field of Search ............... 501/2, 4, DIG. 3, 12; 423/328.1, 328.2, 329.1, 329.2, 331

[56] References Cited

U.S. PATENT DOCUMENTS

| | | | |
|---|---|---|---|
| 4,800,041 | 1/1989 | Tymon et al. | 252/378 R |
| 4,935,387 | 6/1990 | Beall et al. | 501/3 |
| 4,948,758 | 8/1990 | Beall et al. | 501/3 |
| 4,952,388 | 8/1990 | Rittler | 423/327 |
| 5,204,078 | 4/1993 | Tateyama et al. | 423/331 |
| 5,229,094 | 7/1993 | Clauss et al. | 423/331 |

FOREIGN PATENT DOCUMENTS

0503995  9/1992  European Pat. Off. .

*Primary Examiner*—Karl Group
*Assistant Examiner*—Chris Gallo
*Attorney, Agent, or Firm*—Weingarten, Schurgin, Gagnebin & Hayes

[57] ABSTRACT

The present invention relates to synthetic phyllosilicates having a lamellar structure of the type T—O—T devoid of OH$^-$ and F$^-$ ions. Said phyllosilicates are very resistant to oxidation and possess a high thermal stability. The invention further relates to a process for the preparation of said phyllosilicates.

8 Claims, 3 Drawing Sheets

INVENTION $KMg_2AlSi_4O_{12}$

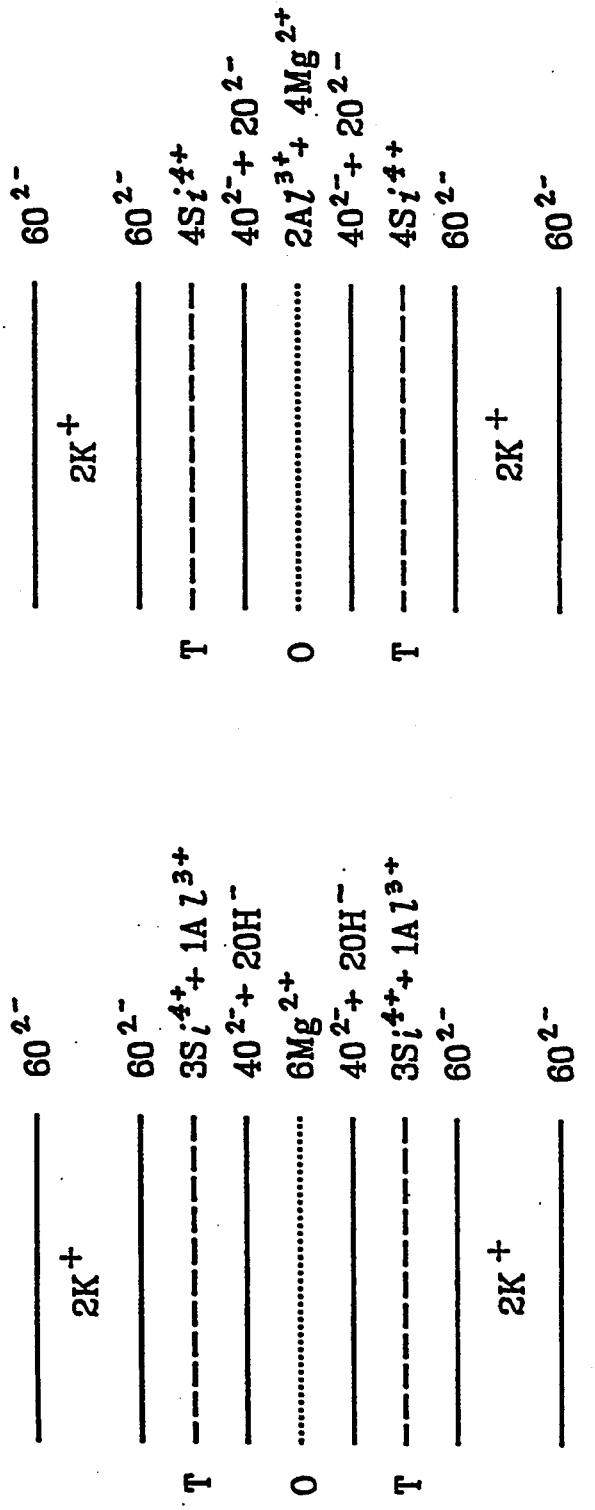

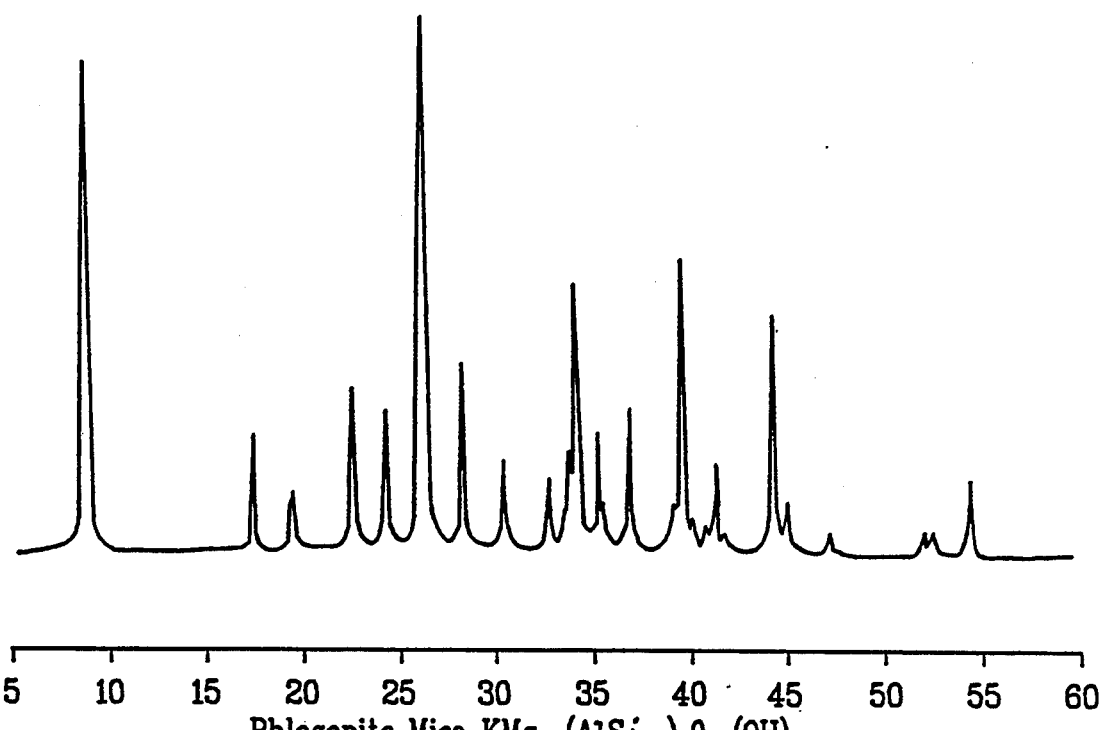
Phlogopite Mica $KMg_3(AlSi_3)O_{10}(OH)_2$
FIG. 3 : X-ray diffraction spectrum
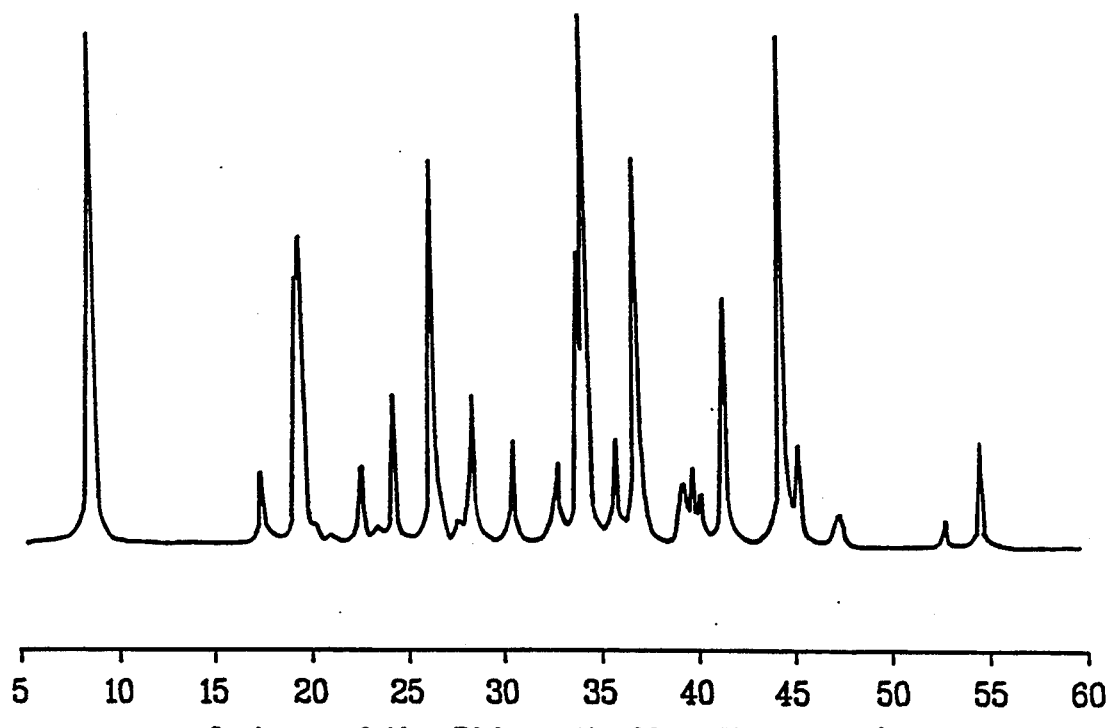
Isotype of the Phlogopite Mica $KMg_2AlSi_4O_{12}$
FIG. 4 : X-ray diffraction spectrum

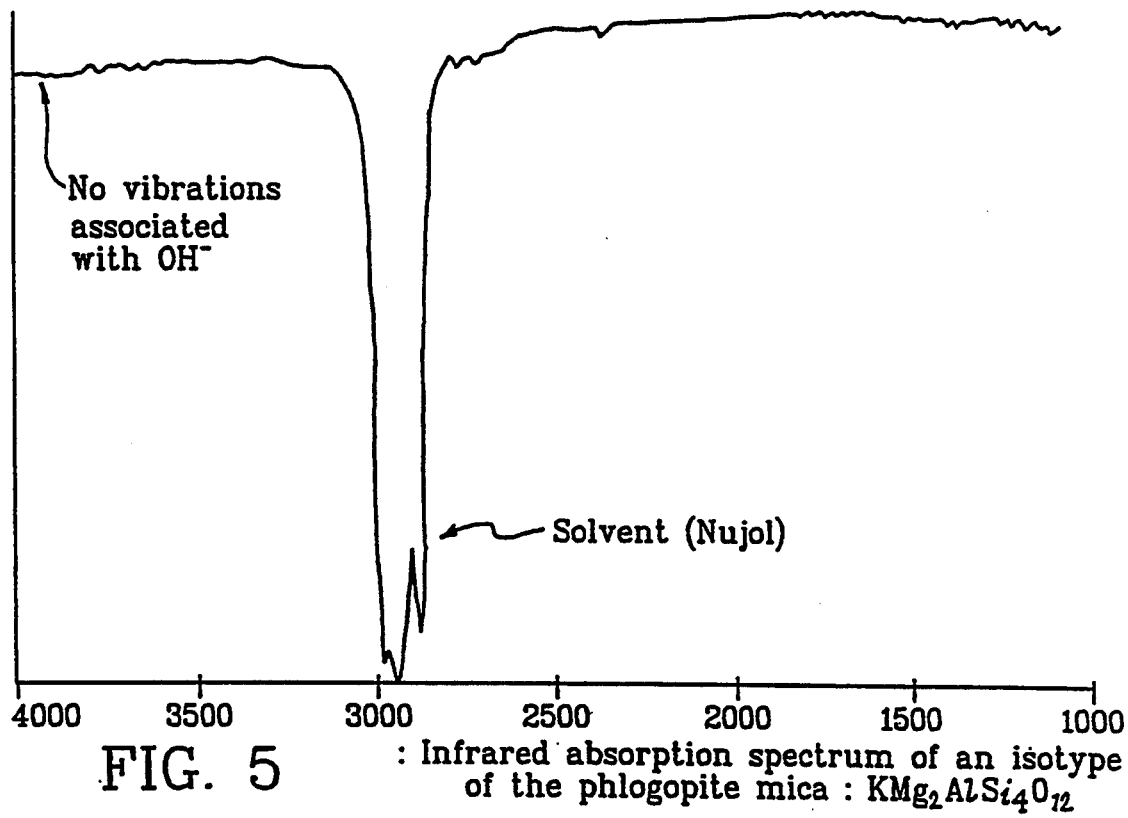
FIG. 5 : Infrared absorption spectrum of an isotype of the phlogopite mica : $KMg_2AlSi_4O_{12}$
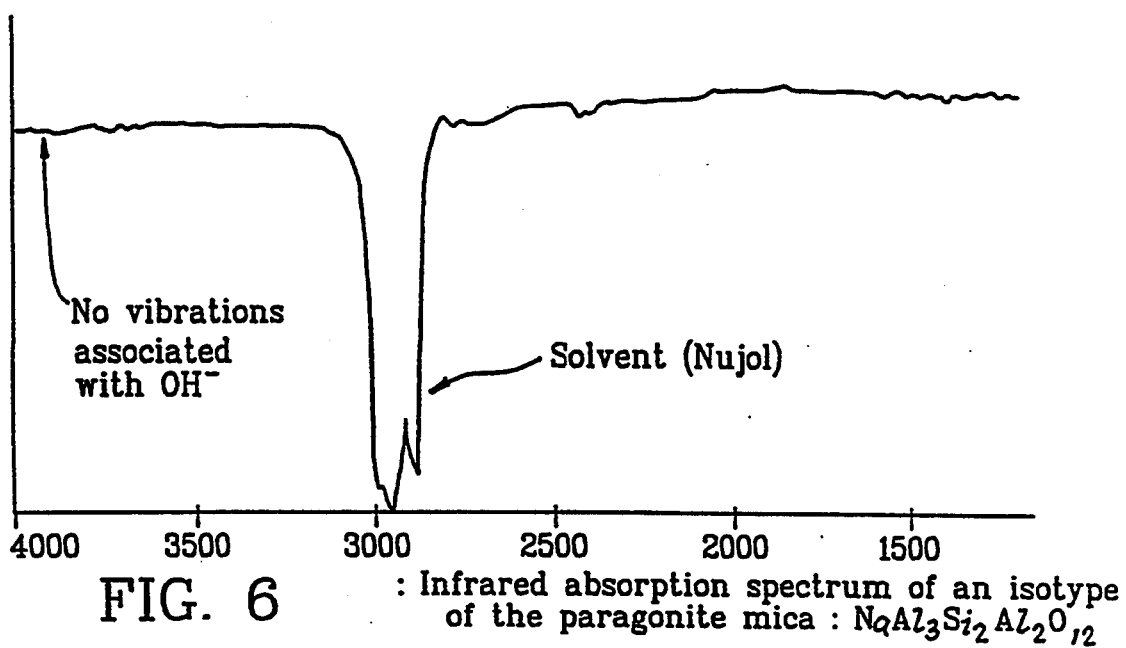
FIG. 6 : Infrared absorption spectrum of an isotype of the paragonite mica : $NaAl_3Si_2Al_2O_{12}$

SYNTHETIC PHYLLOSILICATES AND PROCESS FOR THEIR PREPARATION

The present invention relates to novel synthetic lamellar silicates and to a process for their preparation.

Said novel silicates have a lamellar structure and possess a high resistance to oxidation coupled with a high thermal stability.

Lamellar materials are of particular value in numerous fields such as animal feeds, heterogeneous catalysis, the production of electrochemical electrodes, ceramics, lubricants, etc. Their use as an interphase in composite materials is particularly recommended.

Said lamellar materials are relatively numerous. Examples which may be mentioned are natural phyllosilicates such as talc, micas, etc., and materials having a graphitic structure, such as carbon, boron nitride, etc.

It is known that natural or synthetic lamellar silicates contain $OH^-$ and/or $F^-$ anions in their network. This has been described in particular by R. M. Hazen and D. R. Wones in American Mineralogist, vol. 57, pp. 103-129, 1972. The presence of these hydroxy and fluoride ions limits the thermal stability of said silicates. Thus the majority of natural lamellar silicates decompose at about 600° C. Partial replacement of the hydroxy ions with fluoride ions, as in natural compounds of the fluorophlogopite type, or total replacement of said hydroxy ions with fluoride ions, as described in patent application EP-A-0 366 234 and more particularly in Example 10 of said patent application, in which a mica of the formula $KMg_3(AlSi_3O_{10})F_2$ is prepared, does not provide a perfect solution to the problem of the thermal stability of these materials.

Novel materials are proposed according to the invention, said materials being synthetic silicates which have a lamellar structure and which possess a high resistance to oxidation coupled with a high thermal stability up to about 950° C.

Said novel lamellar silicates of the invention have a structure of the type T—O—T (tetrahedron-octahedron-tetrahedron) devoid of $OH^-$ and $F^-$ ions.

Such a structure is familiar to those skilled in the art, being in particular the structure of natural silicates such as micas or talc, or else pyrophyllite. It is based on a sheet of octahedra lying between two sheets of tetrahedra. The succession of sheets (tetrahedral-octahedral-tetrahedral) forms layers called T—O—T, which may or may not be separated by charge-compensating sheets generally consisting of large cations.

The ions occupy the sites of said tetrahedra and octahedra mainly as a function of their size and also their charge.

For example, it is known that in the case of a mica of the phlogopite type, represented by the formula $KMg_3(AlSi_3)O_{10}(OH,F)_2$, the magnesium ions occupy the octahedral sites, while the smaller silicon and aluminium ions are statistically distributed over the tetrahedral sites. The $K^+$ ions are located in the charge-compensating sheets.

The silicates of the invention, on the other hand, have a structure of the type T—O—T which contains neither hydroxy ions nor fluoride ions.

In a preferred variant of the invention, such a structure contains only $O^{2-}$ anions. In this variant, the silicates of the invention can be qualified as fully oxygenated lamellar silicates or phyllosiloxides.

However, the presence of other anions, especially the nitride ion $N^{3-}$, is not excluded according to the invention.

The cations are chosen and distributed throughout said structure as a function of their size and their charge.

The silicates of the invention are advantageously isotypes of existing natural or synthetic lamellar silicates.

Their structure is derived from that of said existing silicates by replacement of the $OH^-$ and/or $F^-$ ions with $O^{2-}$ and/or $N^{3-}$ ions and by appropriate replacement and/or rearrangement of the cations.

Said replacements and/or rearrangements are obviously not effected in a random manner. The following points should be observed in particular:
the electrical neutrality,
the number of cations in the sites and
the occupation of these sites.

The cations can be replaced and/or rearranged solely for the purpose of compensating the replacement of the anions ($OH^-$, $F^-$ with $O^{2-}$, $N^{3-}$, etc.). It is also possible to envisage additional substitutions of said cations for the purpose of modifying the nature of the chemical bonds within the sheets—both in the octahedral sites and in the tetrahedral sites—and/or between the sheets, obviously as a means of modifying the thermal stability of the material. The decomposition temperature of a material of the invention can thus be adjusted by varying the nature of the ions in the layers and between the layers.

In particular, the silicates of the invention can be isotypes of natural silicates such as micas (for example the phlogopite mica, the paragonite mica, the muscovite mica, etc.), talc or pyrophyllite, this list in no way implying a limitation.

Such silicates forming the subject of the invention have for example the formulae below:
(a) $KMg_2AlSi_4O_{12}$
(b) $KAl_3Si_4N_2O_{10}$
(c) $K_{1-x}Ca_xMg_2Al(Si_{4-x}Al_x)O_{12}$, isotypes of the phlogopite mica which formula is $KMg_3AlSi_3O_{10}(OH)_2$
(d) $NaAl_3Si_2Al_2O_{12}$, an isotype of the paragonite mica which formula is $NaAl_2Si_3AlO_{10}(OH)_2$
(e) $KAl_3Si_2Al_2O_{12}$, an isotype of the muscovite mica which formula is $KAl_2Si_3AlO_{10}(OH)_2$
(f) $CaMg_3Si_4O_{12}$
(g) $BaMg_3Si_4O_{12}$
(h) $SrMg_3Si_4O_{12}$, an isotype of the talc which formula is $Mg_3Si_4O_{10}(OH)_2$
(i) $KTiAlSi_4O_{12}$, an isotype of the pyrophyllite which formula is $Al_2Si_4O_{10}(OH)_2$.

It is easy to see that the replacement of $Mg^{2+}$ with $Mn^{2+}$, $Fe^{2+}$ or $Cu^{2+}$, for example, in the above formulae gives the formulae of other silicates according to the invention. The same approach can be adopted for $Mn^+$ ions, subject to observing the electrical neutrality and the rules governing the correspondence between ion size and site occupation.

Formula (c) illustrates an additional substitution as qualified above.

Replacement of the $OH^-$ anions with $O^{2-}$ in the case of the phlogopite mica, for example, leads to formula (a). $Ca^{++}$ cations have additionally been substituted for some of the $K^+$ cations to give formula (c). This is valuable insofar as the bonds involving calcium ions are stronger.

The silicates of the invention can also be isotypes of synthetic silicates, for example an isotype of the synthetic phlogopite fluoro mica which formula is $KMg_3AlSi_3O_{10}F_2$, etc.

However, their structure is not necessarily derived from that of existing materials.

The silicates of the invention are in divided form.

The process for their preparation constitutes a further subject of the present invention. It comprises:

production of a sol from precursors providing the elements forming part of the composition of the silicate, and an organic solvent;

conversion of said sol to a gel by evaporation of the solvent; and treatment of said gel under temperature and pressure conditions close to or higher than those characterizing the hypercritical state.

The precursors used are advantageously organometallic compounds—alcoholates—and hydrazine for the introduction of nitride ions. They are used in stoichiometric proportions in an organic solvent such as, for example, 2-methoxyethanol.

The sol is produced in an inert atmosphere, for example under a stream of nitrogen.

Said sol is then converted to a gel (xerogel) by evaporation of the solvent under mild thermodynamic conditions, generally at a temperature between 100° and 150° C.

Said gel is then treated under temperature and pressure conditions close to or higher than those characterizing the hypercritical state. Said temperature and pressure conditions obviously depend on the composition and the structure of the target lamellar silicate.

Said treatment generally has to be carried out at a pressure between 10 and 200 MPa and at a temperature between 300° and 850° C. The pressure is advantageously between 50 and 100 MPa.

At the end of this third step, a solid phase is obtained whose physicochemical characteristics can be studied, especially by X-ray diffraction, electron microscopy, IR spectroscopy, etc.

In particular, the absence of the absorption band at 3650 $cm^{-1}$, characteristic of the vibration of hydroxy ions, can be demonstrated by IR spectroscopy.

It is possible to verify by scanning and transmission electron microscopy that said solid phase does indeed possess a lamellar structure, which is known to be responsible for its ability to cleave and for its lubricating properties.

Finally, it is possible to measure the thermal stability of said solid phase.

In connection with the above, those skilled in the art can see that it is possible according to the invention to prepare a whole series of novel lamellar silicates by optimizing the choice of ions and pre cursors, the conditions of preparation of the gel, the thermodynamic parameters of the pseudo-solvatothermal synthesis, etc.

Such a result was totally unpredictable insofar as the $OH^-$ or $F^-$ ions which participate in the constitution of the octahedral and tetrahedral sites seemed to be essential for the stabilization of the network, based on the existing minerals. Thus it has hitherto proved impossible to obtain silicates having a lamellar structure of the type T—O or T—O—T—O', for example isotypes of kaolinite or chlorite.

In FIGS. 1 to 6 attached to the present description:

FIG. 1 schematically represents the structure of a natural mica of the phlogopite type;

FIG. 2 schematically represents in the same way the structure of a silicate of the invention, which is an isotype of said natural mica according to FIG. 1;

FIG. 3 reproduces the X-ray diffraction spectrum of said natural mica of the phlogopite type;

FIG. 4 reproduces the X-ray diffraction spectrum of said silicate of the invention which is an isotype of said natural mica of the phlogopite type;

FIG. 5 shows part of the IR absorption spectrum of said silicate of the invention which is an isotype of said natural mica of the phlogopite type; and FIG. 6 shows part of the IR absorption spectrum of another silicate of the invention, which is an isotype of a natural mica of the paragonite type.

FIG. 1 is therefore a schematic representation of the structure of the natural phlogopite mica of the formula $KMg_3(AlSi_3)O_{10}(OH)_2$. As indicated earlier in the present description, the hydroxy groups and the magnesium cations occupy the octahedral sites (O), while the silicon and aluminum cations are distributed over the tetrahedral sites (T). The Figure represents the structure T—O—T between two charge-compensating sheets containing the potassium cations.

FIG. 2 schematically represents the structure of a synthetic silicate according to the invention, which is an isotype of the natural mica according to FIG. 1. Said silicate of the invention has the formula $KMg_2AlSi_4O_{12}$. Its synthesis is described in Example 1 below. It is a fully oxygenated lamellar silicate or phyllosiloxide.

It is seen in FIGS. 3 and 4 that the two silicates—the natural silicate and the synthetic silicate according to the invention—give the same X-ray diffraction lines.

FIGS. 5 and 6 demonstrate the absence of $OH^-$ groups within the structure of two fully oxygenated silicates of the invention:

that of the formula $KMg_2AlSi_4O_{12}$, an isotype of the mica phlogopite; and that of the formula $NaAl_3Si_2Al_2O_{12}$, an isotype of the mica paragonite. The synthesis of said silicate is described in Example 2 below.

The Examples below illustrate the invention.

EXAMPLE 1

Synthesis of a fully oxygenated isotype of the phlogopite mica: the phyllosiloxide $KMg_2(AlSi_4)O_{12}$ Said material was obtained by the pseudo-solvatothermal synthesis treatment of a precursor gel of the composition $KMg_2(AlSi_4)O_{12}$.

The precursor sol of said gel is prepared by dissolving the corresponding alcoholates (taken in stoichiometric proportions) in the organic solvent 2-methoxyethanol.

For each gram of final material $KMg_2(AlSi_4)O_{12}$ potentially present in the sol, the following are added to 75 ml of refluxing 2-methoxyethanol under a stream of nitrogen:

1.602 g of tetraethyl orthosilicate [TEOS: $Si(OC_2H_5)_4$], 0.166 g of potassium methylate [$KOCH_3$], 0.677 g of magnesium diethylate [$Mg(OC_2H_5)_2$] and 0.584 g of aluminum triisobutylate [$Al(OC_4H_9)_3$], these amounts having been optimized in accordance with the reactivity of the alcoholates and with the experimental conditions employed.

About 5% by weight of nitric acid is also added so as to control the hydrolysis rate and the dissolution of the alcoholates.

The reaction is complete when the sol is translucent and non-viscous.

This sol is then converted to a gel by evaporation between 100° and 150° C.

The xerogel obtained is then isolated in a gold tube (other metals can of course be used, as those skilled in the art will be aware), which is sealed, and subjected to a pseudo-solvatothermal synthesis treatment under the following conditions:

P=1000 bar ($10^8$ Pa)
T=800° C.
t=48 h

The material obtained was analyzed by X-ray crystallography. It gives the same X-ray diffraction lines as the natural mica phlogopite: $KMg_3(AlSi_3)O_{10}(OH)_2$ (cf. FIGS. 3 and 4). IR spectroscopy revealed the absence of the absorption band characteristic of hydroxy groups at 3650 $cm^{-1}$ (cf. FIG. 5).

A study by scanning electron microscopy clearly showed that the particles of the phase $KMg_2(AlSi_4)O_{12}$ have a lamellar morphology (hexagonal platelets), confirming the sheet structure of the novel material according to the invention.

Said novel material is stable up to 900° C., compared with about 650° C. for the natural phlogopite mica.

EXAMPLE 2

Synthesis of a fully oxygenated isotype of the paragonite mica: the phyllosiloxide $NaAl_3(Si_2Al_2)O_{12}$ Said material was obtained by the pseudo-solvatothermal synthesis treatment of a precursor gel of the composition $NaAl_3(Si_2Al_2)O_{12}$. Said synthesis is analogous to that described in Example 1. The solvent used is the same, namely 2-methoxyethanol.

For each gram of final material $NaAl_3(Si_2Al_2)O_{12}$ potentially present in the gel, the following are added to the refluxing solvent under a stream of nitrogen:

1.102 g of tetraethyl orthosilicate [TEOS: $Si(OC_2H_5)_4$],
0.180 g of sodium ethylate [$NaOC_2H_5$] and
3.258 g of aluminum triisobutylate [$Al(OC_4H_9)_3$].

The sol is converted to a gel as indicated in Example 1 (evaporation between 100° and 150° C.).

The optimal conditions of solvatothermal synthesis are as follows:

P=800 bar ($8.10^7$ Pa)
T=600° C.
t=48 h

Various methods of characterization made it possible to establish that a novel oxide of the formula $NaAl_3(Si_2Al_2)O_{12}$ had been formed. X-ray crystallographic analyses on powders revealed diffraction lines similar to those of the dioctahedral paragonite mica: $NaAl_2(Si_3Al)O_{10}(OH)_2$.

A study by IR absorption spectroscopy showed that the novel material is devoid of hydroxy groups (cf. FIG. 6).

In addition, its lamellar morphology was demonstrated by transmission electron microscopy: small sheet-like platelets of 0.1 μm were observed.

EXAMPLE 3

Synthesis of a fully oxygenated isotype of the phlogopite mica, partially substituted with calcium The synthesis carried out is analogous to that described in Example 1. It made it possible to obtain a series of novel materials of the general formula $K_{1-x}Ca_xMg_2Al_{1+x}Si_{4-x}O_{12}$, it being possible for the value of x to vary between 0.1 and 0.4.

For 1 g of $K_{1-x}Ca_xMg_2Al_{1+x}Si_{4-x}O_{12}$, the following are added to 75 ml of refluxing 2-methoxyethanol under a stream of nitrogen:

1.785 g to 1.925 g of tetraethyl orthosilicate [TEOS: $Si(OC_2H_5)_4$],
0.100 g to 1.151 g of potassium methylate [$KOCH_3$],
0.646 g to 0.823 g of aluminum triisobutylate [$Al(OC_4H_9)_3$],
0.027 g to 0.107 g of calcium dimethylate [$Ca(OCH_3)_2$] and
0.546 g of magnesium diethylate [$Mg(OC_2H_5)_2$].

The experimental conditions for producing sols of different compositions (proportion of calcium varying from 0.1 to 0.4) and their conversion to gels were the same as those described in the previous Examples.

The xerogels obtained were then treated under the following solvatothermal conditions:

P=100 to 500 bar (1 to $5.10^7$ Pa)
T=750° to 800° C.
t=48 to 72 h

Various methods of characterization made it possible to show the existence of a family of materials which are isotypes of a phlogopite mica, in which the potassium has been partially replaced with calcium.

What is claimed is:

1. A synthetic phyllosilicate having a lamellar structure of the type T—O—T (tetrahedron-octahedron-tetrahedron) devoid of $OH^-$ and $F^-$ ions.

2. A phyllosilicate according to claim 1 which is an isotype of a natural or synthetic lamellar silicate and whose structure is derived from that of said natural or synthetic lamellar silicate by replacement of the $OH^-$ and/or $F^-$ ions with $O^{2-}$ and/or $N^{3-}$ ions and appropriate replacement and/or rearrangement of the cations.

3. A phyllosilicate according to claim 2 which is an isotype of a silicate selected from micas, talc and pyrophyllite.

4. A phyllosilicate according to claim 3 which is an isotype of the phlogopite mica, paragonite mica or muscovite mica.

5. A phyllosilicate according to claim 1 which has one of the following formulae:

$KMg_2AlSi_4O_{12}$
$KAl_3Si_4N_2O_{10}$
$K_{1-x}Ca_xMg_2Al_{1+x}Si_{4-x}O_{12}$, where $0.10 \leq x \leq 0.40$
$NaAl_3Si_2Al_2O_{12}$
$KAl_3Si_2Al_2O_{12}$
$CaMg_3Si_4O_{12}$
$BaMg_3Si_4O_{12}$
$SrMg_3Si_4O_{12}$
$KTiAlSi_4O_{12}$.

6. A process for the preparation of a phyllosilicate according to claim 1, which comprises:

production of a sol from precursors providing the elements forming part of the composition of said phyllosilicate, and an organic solvent;

conversion of said sol to a gel by evaporation of said solvent; and treatment of said gel under temperature and pressure conditions close to or higher than those characterizing the hypercritical state.

7. A process according to claim 6 wherein said precursors are selected from alcoholates and hydrazine.

8. A process according to claim 6 wherein the treatment of said gel is carried out at a temperature between 300° and 850° C. and at a pressure between 10 and 200 MPa.

* * * * *